United States Patent
Ausserlechner

(10) Patent No.: US 9,746,346 B2
(45) Date of Patent: *Aug. 29, 2017

(54) LINEAR POSITION AND ROTARY POSITION MAGNETIC SENSORS, SYSTEMS, AND METHODS

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 8 days.

This patent is subject to a terminal disclaimer.

(21) Appl. No.: 14/845,465

(22) Filed: Sep. 4, 2015

(65) Prior Publication Data

US 2016/0069710 A1    Mar. 10, 2016

Related U.S. Application Data

(63) Continuation-in-part of application No. 14/482,457, filed on Sep. 10, 2014.

(51) Int. Cl.
    *G01P 3/48*      (2006.01)
    *G01D 5/20*      (2006.01)
    *G01D 5/245*      (2006.01)

(52) U.S. Cl.
    CPC ............ *G01D 5/20* (2013.01); *G01D 5/2454* (2013.01)

(58) Field of Classification Search
    CPC ......... G01P 3/443; G01P 3/488; G01P 3/487; G01P 3/481; G01P 3/685; G01P 1/026; G01P 3/66; G01P 3/68; G01P 3/665; G01D 5/145; G01D 5/147; G01D 5/2457; G01D 5/2013; G01D 5/2046; G01B 7/30; G01B 7/312; G01B 7/14

USPC ................ 324/173–174, 178–179, 161, 162, 324/207.2–207.25, 259

See application file for complete search history.

(56) References Cited

U.S. PATENT DOCUMENTS

6,118,271 A *   9/2000   Ely ....................... G01D 5/2046
                                                  324/207.17
6,366,085 B1   4/2002   Yeshurun
(Continued)

FOREIGN PATENT DOCUMENTS

CN        101092994 A     12/2007

OTHER PUBLICATIONS

Ausserlechner, Udo. "Closed Analytical Formulae for Multi-Pole Magnetic Rings." Progress in Electromagnetic Research B, vol. 38, 71-105. (2012).

(Continued)

*Primary Examiner* — Thang Le
(74) *Attorney, Agent, or Firm* — Eschweiler & Potashnik, LLC

(57) ABSTRACT

Embodiments relate to a position sensor comprising a magnetic target. The magnetic target includes a magnetic multipole configured to generate a magnetic field. The magnetic field has three mutually-perpendicular components at a first region. Sensor elements can be configured to measure these field components at the first region. In embodiments, comparing the amplitudes of the components can be used to determine a global position, and the instantaneous values of these components can be used to determine a local position.

19 Claims, 11 Drawing Sheets

(56) References Cited

U.S. PATENT DOCUMENTS

| | | | |
|---|---|---|---|
| 7,423,420 B2* | 9/2008 | Meyersweissflog | G01D 5/2457 |
| | | | 324/174 |
| 8,089,275 B2 | 1/2012 | Riedmueller | |
| 8,421,446 B2 | 4/2013 | Straubinger et al. | |
| 8,717,010 B2 | 5/2014 | Ausserlechner et al. | |
| 9,279,702 B2* | 3/2016 | Ritter | G01D 5/16 |
| 2005/0007102 A1 | 1/2005 | Butzmann | |
| 2006/0186881 A1 | 8/2006 | Tilbrook | |
| 2008/0044119 A1 | 2/2008 | Aoki et al. | |
| 2008/0265877 A1* | 10/2008 | Kato | G01D 5/245 |
| | | | 324/207.25 |
| 2011/0080162 A1* | 4/2011 | Steinich | G01B 7/30 |
| | | | 324/207.25 |
| 2011/0101964 A1 | 5/2011 | Ausserlechner et al. | |
| 2012/0025808 A1* | 2/2012 | Granig | G01D 5/145 |
| | | | 324/202 |
| 2012/0161755 A1 | 6/2012 | Masson et al. | |
| 2014/0232378 A1 | 8/2014 | Ludwig | |
| 2014/0292313 A1* | 10/2014 | Ueda | G01B 7/30 |
| | | | 324/207.21 |

OTHER PUBLICATIONS

Non Final Office Action Dated Dec. 30, 2016 U.S. Appl. No. 14/482,457.
Final Office Action dated Jul. 6, 2017 in connection with U.S. Appl. No. 14/482,457.

* cited by examiner

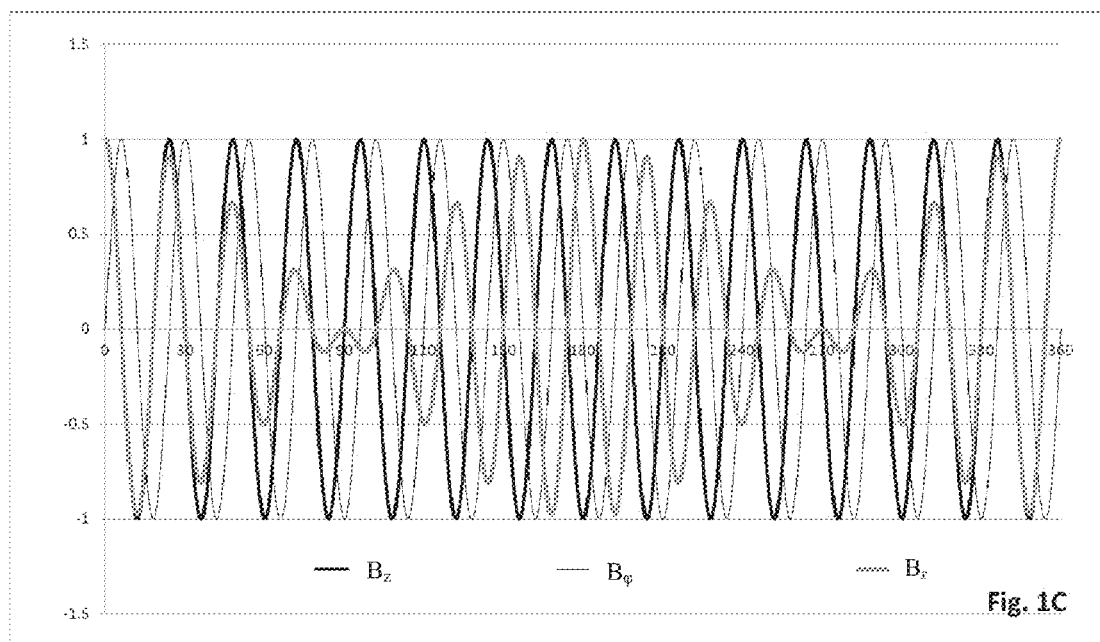

LINEAR POSITION AND ROTARY POSITION MAGNETIC SENSORS, SYSTEMS, AND METHODS

REFERENCE TO RELATED APPLICATION

This Application is a Continuation-In-Part of U.S. application Ser. No. 14/482,457 filed on Sep. 10, 2014, the contents of which are incorporated by reference in their entirety.

FIELD

Embodiments relate generally to linear position and rotary position magnetic sensors, systems, and methods, and more particularly to a single-chip angle sensors and systems and magnetic targets that generate unique ratios derived from different signal components.

BACKGROUND

In many applications, the rotational speed, position, or angle of a shaft or other rotating component is determined using magnetic field sensors. For example, Hall sensors or magnetoresistive sensors (such as GMR, AMR, TMR, etc.) can be arranged on or adjacent to the rotating component. In off-axis sensing, the rotating component includes a magnetic multipole that has permanently magnetized portions, such that as the rotating component rotates a sensor positioned off of the rotational axis observes fluctuations in the magnetic field strength and/or direction.

There are many possible axial orientations of the sensor in an off-axis system. In general, one edge of a sensor die is kept parallel to the rotational axis of the rotating component. More particularly, two primary orientations are most commonly used for cylindrical, rotating components such as cam-shafts. In the first, the surface of the die is tangential to a cylindrical surface (where the axis of the cylinder coincides with the rotational axis). In the second, the surface of the die is perpendicular to the cylindrical surface. The magnetic target can be a diametrically magnetized component that is mounted on the rotating component, either at a point along the length of the component or else at an end of the component. Conventional systems measure the absolute rotational position of the rotating component by measuring the magnetic field caused by the multipole at each of several locations.

In similar conventional systems, linear position can also be ascertained using multiple sensor dies arranged along a linearly moving magnetic target.

SUMMARY

Embodiments relate to a position sensor comprising a magnetic target comprising a magnetic multipole configured to generate a magnetic field. The magnetic field comprises, at a first region, a first component, a second component, and a third component, wherein the first, second, and third components are mutually perpendicular to one another at the first region. The position sensor further comprises a sensor die having a first sensor element configured to measure the first component at the first region, and a second sensor element configured to measure one of the other components substantially at the first region.

According to another embodiment, a magnetic multipole comprises an alternating sequence of magnetic south and north poles arranged along a first direction arranged such that a magnetic field generated by the magnetic multipole at a first region has a first component, a second component, and a third component, wherein the first, second, and third components are mutually perpendicular at the first region. The magnetic multipole can be arranged along an expected sensor track such that the first component has an amplitude that is not uniform along the sensor track. According to another embodiment, a method of determining a position of a member that is movable in a first direction comprises arranging a magnetic multipole along a first direction, the magnetic multipole comprising a plurality of magnetic poles having alternating polarity, arranging at least two magnetic sensor elements at a first region proximate to the magnetic multipole and spaced apart from the magnetic multipole in a second direction, wherein the second direction is perpendicular to the first direction, sensing a first magnetic field component along a third direction, wherein the third direction is perpendicular to both the first and second directions at the first region to generate a first signal, sensing a second magnetic field component along a fourth direction that is perpendicular to the third direction at the first region to provide a second signal, deriving from the first signal first information indicative of an amplitude of a signal course of the first magnetic field component and deriving from the second signal second information indicative of an amplitude of a signal course of the second magnetic field component, and combining the first and second information in order to provide a global position of the member.

BRIEF DESCRIPTION OF THE DRAWINGS

Embodiments may be more completely understood in consideration of the following detailed description in connection with the accompanying drawings, in which:

FIG. 1C is a chart of the radial, axial, and azimuthal field strengths corresponding to an eccentrically mounted multipole ring, according to an embodiment.

Figure 1A:
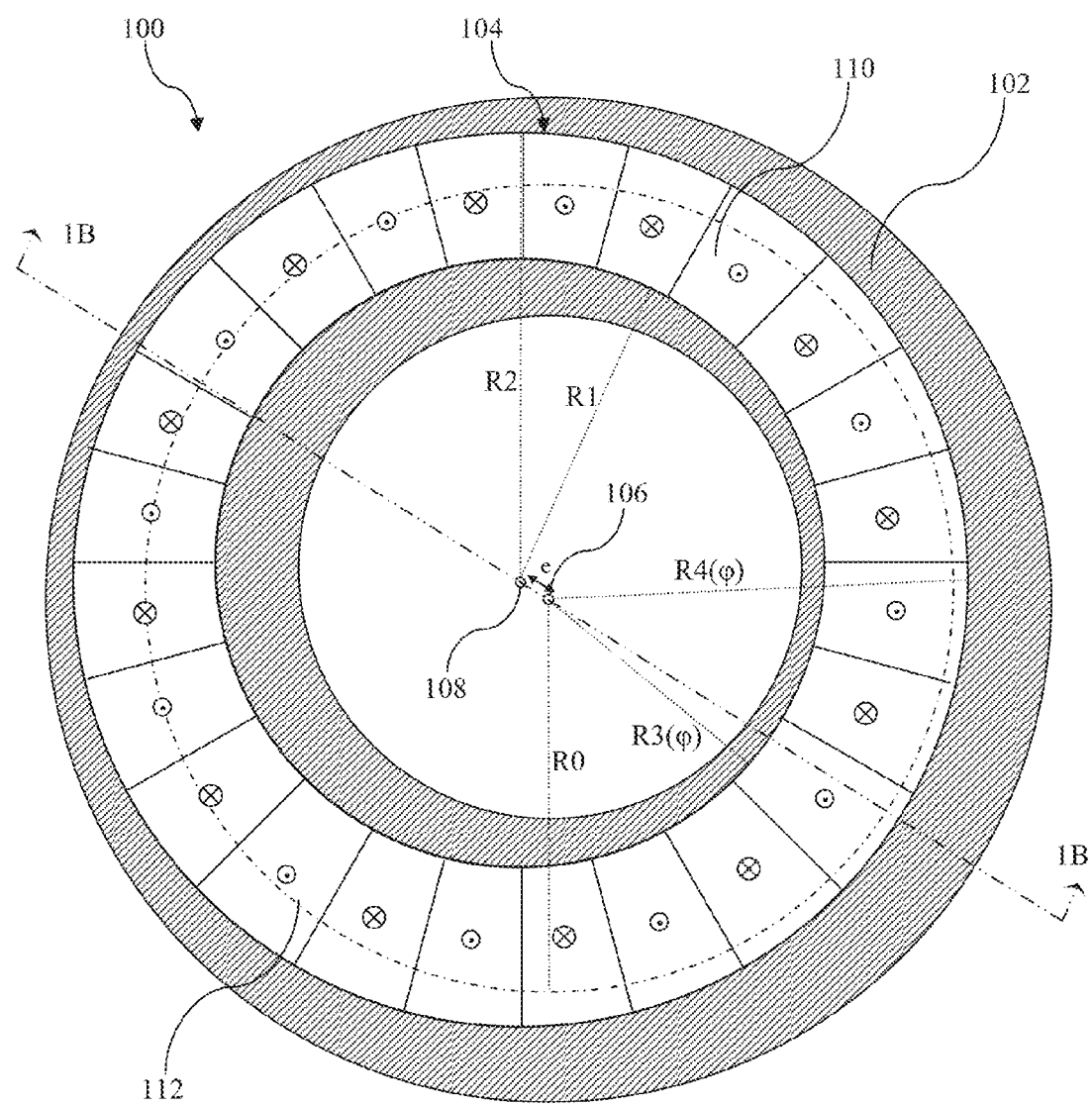
FIG. 1A is a plan view of a magnetic target having an eccentrically mounted magnetic multipole ring, according to an embodiment.

While embodiments are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to sensors, systems, and methods for detection of angle and/or position of components. In various embodiments, permanent magnet code wheels or strips can be arranged such that as a rotating component turns, a single off-axis sensor die or chip can be used to gather sufficient data to ascertain the rotational position of that rotating component. In embodiments, this can be accomplished using a magnetic code wheel that is arranged about an eccentric axis, and/or the code wheel can have an irregular (e.g., elliptical, discontinuous, or other non-toroidal) shape. In other embodiments, a single sensor chip or die can be used to gather sufficient data to ascertain the position of a linearly-moving target having a magnetic portion that is arranged to provide a unique magnetic signal as a function of its position.

Figure 1B:
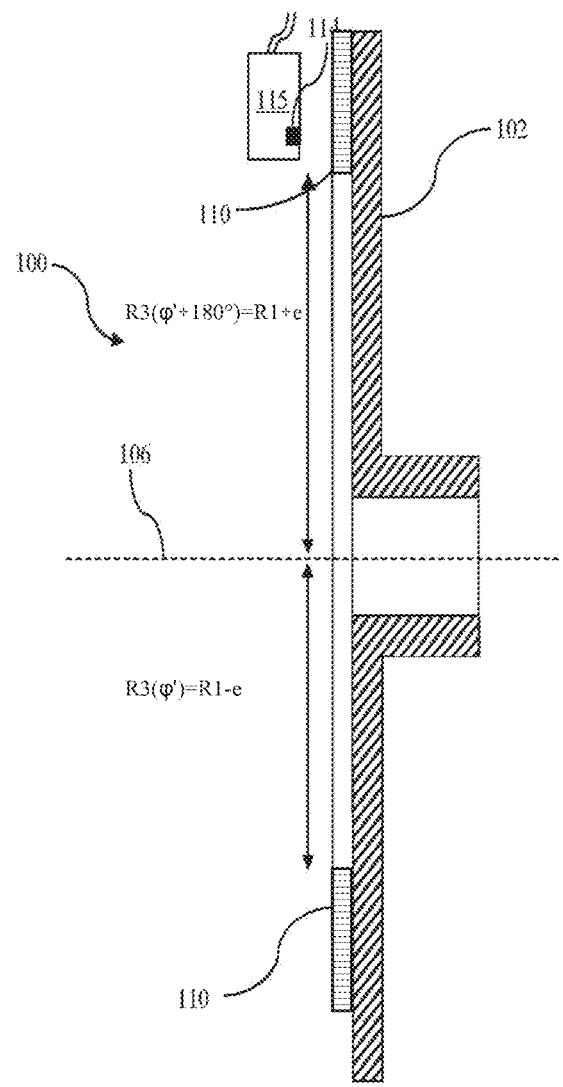
FIG. 1B is a cross-sectional view of the magnetic target of FIG. 1A along line 1B-1B, further showing a magnetic sensor element and a sensor die, according to an embodiment.

FIGS. 1A and 1B show magnetic target 100, which can be used to measure the rotational position of an attached rotating component such as a rotating shaft (not shown). Magnetic target 100 comprises first portion 102 and permanent magnet ring (PMR) 104. First portion 102 is a structural component that supports PMR 104. PMR 104 and first portion 102 are rigidly attached to each other. In embodiments, PMR 104 is an arrangement of multiple magnetic pole pairs which are distributed along a path 112, e.g. a circular path, an elliptical path, a spiral portion etc. The pole pairs are distributed along the path such that a magnetic south pole is adjacent to a magnetic north pole and vice versa. In some embodiments, the pole pairs may be distributed regularly along PMR 104. Such distributions may assist in providing an easier calculation of a rotating position. In other embodiments, the pole pairs may be distributed irregularly along PMR 104. Such distributions may increase the effort of calculation but may on the other hand assist in determining a unique rotating position for all rotational positions. In some embodiments, the pole pairs are of equal size and shape. In some embodiments, the pole pairs may have varying sizes or varying shapes or both.

In the embodiment shown, first portion 102 is a disk, although in other embodiments first portion 102 could have any other geometry configured to support a PMR (e.g., PMR 104). In various embodiments, first portion 102 can also be configured to mount to a rotating component (not shown), such as a cam shaft. First portion 102 can be mounted, for example by interference fit or threaded engagement, to co-rotate with such a component about a common axis, COR 106. Center of rotation (COR) 106 is the center of rotation of the PMR 104. In addition COR 106 is also the center of rotation for the first portion 102. First portion 102 can be, for example, a ferrous steel disk configured to be mounted to a cam shaft or other shafts. PMR 104, as shown in FIGS. 1A and 1B, is a toroidal loop. In some embodiments, all pole pairs are arranged to be substantially within a plane perpendicular to the axis of rotation, as can for example be observed from FIG. 1B. In the embodiment shown in FIGS. 1A and 1B, PMR 104 is a permanent magnetic multipole with the pole pairs distributed along a circle with inner radius R1 and outer radius R2. Center of Permanent Magnet (CPM) 108 is the geometric center of PMR 104. While PMR 104 may be symmetrical with respect to CPM 108, in other embodiments PMR 104 may be shaped to be not symmetrical with respect to CPM 108. A plurality of magnetic elements or segments 110 make up PMR, and are permanently magnetized portions. Thus, the magnetic field strength and direction around PMR 104 changes as a function of position. In the embodiment shown in FIGS. 1A and 1B, the direction of magnetization of segments of PMR 104 is axial, whereas in various alternative embodiments segments of PMR 104 could be magnetized in an azimuthal direction, or in more complex arrangements such as Halbach magnetization. Further, although PMR 104 of FIGS. 1A and 1B is a toroid, in other embodiments PMR 104 could be elliptical, or be irregularly shaped as described, for example, in the embodiment depicted in FIG. 2A. In some embodiments PMR 104 is positioned along sensor track 112, as described in more detail below. Sensor track 112 is a virtual circle around the axis of rotation centered in COR 106, the radius of the circle determined by the radial distance of the sensor to the axis of rotation. As known to a skilled person sensor track 112 is a virtual track which is obtained by kinematic inversion, i.e. assuming the rotatable parts to be fixed and the non-rotatable sensor to be rotatable. In other words, while the sensor is mounted to be non-rotatable, the various position of the sensor with respect to the rotatable parts (such as for example PMR 104) are reflected by assuming the sensor to be rotatable along the sensor track 112 and the rotatable part to be fixed. Since PMR 104 is positioned along sensor track 112, a projection of the sensor track 112 in air gap direction is fully located within the boundaries of PMR 104. Air gap is the minimum distance between the sensor element and PMR 104 and the air gap direction is the direction in which the minimum distance is obtained.

In FIG. 1A a projection of sensor track 112 is fully encompassed within PMR 104 although the radial distances R3 and R4 of the boundaries of PMR 104 vary. In embodiments, the air gap between a respective sensor element 114 and PMR 104 is constant in the course of rotation. Embodiments in which the sensor track projection along air gap direction is fully within the boundaries of PMR 104 allow for a constant air gap distance and thereby to obtain an oscillatory behavior with a constant amplitude of at least one magnetic component along the sensor track while at least one other magnetic component has an oscillatory behavior with a varying amplitude along the sensor track due to irregularities such as an eccentricity e (see FIG. 1A) or spiral shape (see FIG. 2A) etc. as will be described later. Distinguished therefrom, sensing systems in which the air gap changes in the course of rotation typically do not allow achieving a constant amplitude of at least one field component because the varying radial distance between sensor element and PMR 104 modulates the amplitude for all field components. Sensor element 114 is arranged on sensor die 115. Sensor die 115 is a mounted to be non-rotating. Sensor die 115 is positioned in a region in which there are three components of the incident magnetic field (i.e., axial, azimuthal, and radial) that are mutually perpendicular to one another. At certain rotational positions one or two of these components may vanish (see FIG. 1C). In various embodiments, sensor element 114 can be a Hall effect sensor element, or a magnetoresistive sensor element. In embodiments, sensor die 115 can include multiple sensor elements. For example, in some embodiments, sensor die 115 can include a sensor element 114 that is sensitive to magnetic field components along the radial direction (i.e., a direction orthogonal to COR 106). In other embodiments, sensor die 115 can include a sensor element 114 that is sensitive to magnetic field components along the radial direction, as well as a second sensor element 114 that is sensitive to magnetic field components in the axial direction (i.e., parallel COR 106) or the azimuthal direction (i.e., tangential to sensor track 112). Sensor track 112 is a track along which the sensor element 114 is configured to measure a magnetic field strength and/or direction.

Various distances are referred to herein with respect to FIGS. 1A and 1B, including eccentricity e (the distance from COR 106 to CPM 108), reading radius R0 (the distance from COR 106 to sensor track 112), inner radius R1 (the distance from CPM 108 to the inner radial edge of PMR 104), and outer radius R2 (the distance from CPM 108 to the outer radial edge of PMR 104). Furthermore, radius R3 is shown as a function of the angle of rotation of magnetic target 100, $\phi$. R3($\phi$) is the distance between COR 108 and the inner radial edge of PMR 104. Likewise, R4($\phi$) is the distance between COR 108 and the outer radial edge of PMR 104. As such, the cross-section shown in FIG. 1B (parallel to eccentricity e), R3($\phi'$+180°)=R1+e at one side—the side of maximum distance between COR 108 and PRM 104 as a function of $\phi$—and R3($\phi$)=R1−e at the other side—the side of minimum distance between COR 108 and PMR 104 as a function of $\phi$. R4($\phi$) is equal to R3($\phi$) plus the radial width of PMR 104, which is shown as substantially constant in the embodiments depicted in FIGS. 1A and 1B.

In the embodiment shown in FIGS. 1A and 1B, eccentricity e is sufficiently large that it exceeds the mounting tolerances of PMR 104 and sensor element 114. Eccentricity e is also small enough that all rotational positions of sensor element 114 are between radii R3($\phi$) and R4($\phi$). That is, during rotation of magnetic target 100 about COR 106, magnetic elements 110 that make up PMR 104 are always positioned along sensor track 112, which is axially adjacent to sensor element 114. In some embodiments, the radial width of the PMR 104 may be double the eccentricity e. In other embodiments, the radial width of the PMR may vary.

Magnetic target 100 is configured to co-rotate with a rotating component, and to generate a unique magnetic field signal pattern as first portion 102 rotates, due to the eccentricity of permanent magnet ring 104. FIG. 1A shows magnetic target 100 in plan view, illustrating the eccentric axis of rotation of permanent magnet ring 104, while FIG. 1B is a cross-sectional view of magnetic target 100 along line 1B-1B of FIG. 1A. Magnetic target 100 of FIGS. 1A and 1B is an embodiment of a structure that can be used in combination with one or more magnetic field sensor elements 114 arranged on a single sensor die or chip 115 to ascertain the rotational position of an attached rotating component (not shown). Such rotating components are utilized in a variety of industries, including but not limited to automotive and aerospace fields. For example, magnetic target 100 could be mechanically coupled to a cam shaft of an automotive engine. Often, it is desirable to obtain the rotational position of a part that is located in close proximity to various other components of a larger system. As such, magnetic target 100 is configured to provide absolute rotational position information.

As magnetic target 100 rotates about COR 106, non-rotating sensor element 114 can detect a magnetic field strength along any of the radial, azimuthal, and/or axial directions (with respect to the direction of rotation). Due to the alternating magnetization directions of magnetic elements 110 in the embodiment shown in FIG. 1A along the direction of movement, the field strength in each of these directions has an oscillatory behavior e.g. a sinusoidal component. Depending on the exact manufacturing technology and magnetization procedure, the magnetization of a single magnetic element 110 may be inhomogeneous. Nonetheless, one can compute the resulting magnetic field by assuming virtual magnetic charges on the surface and in the volume of PMR 104 at each magnetic element 110, which are arranged in a north-south pole pattern. The field strength in the radial direction additionally varies as a result of the eccentricity e. The radial field strength at those rotational positions in which the outer radial edge of one of the magnetic elements 110 is adjacent to sensor element 114 is relatively strong, the radial field strength at those rotational positions in which the inner radial edge of one of the magnetic elements 110 is adjacent to sensor element 114 is relatively strong with opposite sign, whereas the radial field strength at those rotational positions in which the magnetic elements 110 are nearly equally distant to both inner and outer radial edges of the magnetic elements goes through zero. For the multipole ring shown in FIG. 1A the magnetic field component pointing from a test point towards CPM 108 vanishes if the distance of the test point to CMP 108 equals sqrt(R1*R2), which is slightly smaller than (R1+R2)/2.

Various components of a magnetic field incident on sensor die 115 can be measured by additional sensor elements that are positioned on sensor die 115. For example, as described in more detail below with respect to FIG. 4, in some embodiments sensor elements 114 can be arranged on sensor die 115 in order to measure magnetic field components in the azimuthal, axial, and/or radial directions. In still further embodiments, field gradients along a given direction can be measured by positioning sensor elements 114 configured to measure the field components of the same direction at various positions arranged along a different direction (e.g., positioning sensor elements 114 configured to sense magnetic field components in the radial direction at multiple positions along the azimuthal direction in order to determine a gradient in the azimuthal direction of the radial magnetic field component, i.e. dBr/d$\phi$). Axial and azimuthal field components are oscillatory, e.g. sinusoidal, with substantially constant amplitudes throughout the entire rotation of magnetic target 100. In contrast, the radial field component is oscillatory, e.g. sinusoidal (with the same spatial period as the axial and azimuthal components), but the amplitude of the radial component is a function of the absolute rotational position of magnetic target 100, because the radial distance of the sensing elements to the radial center sqrt(R3(phi)*R4 (phi)) varies with rotational position phi. Comparing the radial field component or the amplitude of the radial field component to the axial or azimuthal field components (or both) or the amplitudes of axial or azimuthal field components (or both) can be used to produce a signal that corresponds to the global rotational position of magnetic target 100. Thereby, we denote A as amplitude of a sine wave f(x)=A*sin(x), and for more general kinds of periodic waveforms we define it consistently as A=(max(f(x))−min(f(x)))/2 with x0<x<x0+lamda, whereby lamda is the spatial period of the wave (e.g. lamda is equal to the length of one north pole and one neighboring south pole of the multipole ring along azimuthal direction). The comparison can be, for example, division of amplitudes of the two signals (e.g., radial component amplitude divided by axial component amplitude, or radial component amplitude divided by azimuthal component amplitude). In other embodiments, as described in more detail below, comparison can be a function of all three components together (e.g., radial amplitude squared divided by the sum of squares of the azimuthal and axial components). This is e.g. the case if azimuthal and axial components have equal amplitudes, because then it becomes very easy to determine their common amplitude by sampling azimuthal and axial field components at the same location and taking the square root of the sum of squares of both: amplitude=sqrt(Bphi^2+Bz^2).

One way to detect the amplitude of a magnetic field component is to sample this field component at two locations x1 and x2. This gives B1 at x1 and B2 at x2. These two locations x1, x2 must be along the direction of movement in a distance which is equal to a quarter of the spatial period. In case of FIG. 1A these two locations must be on the reading circle 112 spaced apart by half of the size of a pole. Then the amplitude is obtained by sqrt(B1^2+B2^2).

These comparisons of amplitudes may provide a global position of the magnetic target 100, to within 360°/N, where N is the number of pole-pairs in the magnetic target 100. For a local position measurement, the values (rather than the amplitudes) of the radial, azimuthal, or axial components can be measured. By considering both the global and local position outputs, the absolute position of magnetic target 100 can be ascertained.

Comparing the radial field component to the axial or azimuthal field components, rather than to predetermined or historical values, can be used to correct for various offsets and/or errors. For example, this comparison can be used to correct for thermal offsets, or for lifetime drift of the sensor elements. Furthermore, in gradiometric embodiments the outputs of two sensor elements arranged to sense a component of the field can be subtracted in order to cancel out homogeneous background fields. As such, homogeneous background magnetic fields need not be actually measured; rather, they are canceled out inherently by the subtraction of the sensed field components at the sensor elements. The sensor elements 114 may be provided and arranged in some embodiments to measure both, the gradient and absolute value of at least one magnetic field component. It is to be noted that the schemes for determining a rotation position described herein by utilizing measured absolute values or absolute amplitudes of a magnetic field components can be equally applied in a similar manner to measured field gradient values of the magnetic field component or amplitudes of field gradients of the magnetic field components. This is obtained since the gradient of a sine wave is again a sine wave (just shifted by a quarter of its spatial period) and the amplitude of a sine wave is linked via a scaling factor to the amplitude of the gradient of this sine wave.

In each of the embodiments described above, and in particular for the embodiment shown with respect to FIGS. 1A and 1B, the system does not deliver unique magnetic field readings at sensor 114 over the course of an entire revolution of magnetic target 100. The minimum and maximum inner radial distances (i.e., the extrema of R1) are located a half rotation from one another, and are associated with the largest radial magnetic field amplitude. A quarter revolution away of these two rotational positions the sensor track is midway (in plan view) between inner and outer edges of magnetic poles and there the radial magnetic field has vanishing amplitude. So the radial magnetic field pattern resembles an amplitude modulated signal with maximum amplitude at rotational position phi1 (e.g. in FIG. 1C phi1 is 0° as will be described later on), vanishing amplitude at rotational position phi1+90°, again maximum amplitude at rotational position phi1+180°, followed by vanishing amplitude at rotational position phi1+270°. Note that the signal of the radial magnetic field component Br reverses its sign at phi1+90° and again it reverses its sign at phi1+270°. So the radial magnetic field component Br exhibits a phase jump of 180° when it passes phi1+90° or phi1+270°. Conversely the phases of the signals of the other magnetic field components do not change. This is due to the fact that the sensor track passes the radial magnetic center line (=sqrt(R3(phi)*R4(phi))) of the poles which causes to change the direction of the measured radial field component. Therefore, with respect to the other two field components, a phase jump of half a period is observed for the radial field component at ph1+90° and ph1+270°. The phase shift between the radial field component and one of the two other orthogonal field components (e.g. in FIG. 1C azimuthal field component Bϕ) is +90° for rotational positions between phi1 and phi1+90°, whereas this phase shift is −90° for rotational positions between phi1+90° and phi1+180°. Thus, the absolute rotational position can be ascertained by the unique values of amplitude and phase shift in the angular range of phi1 and phi1+180° provided by sensor element 114. However, at rotational position phi1+181° the sensor detects the same amplitude and phase shift between the radial field component and the one other field component as on rotational position phi1+179°. Also at rotational position phi1+1° the sensor detects the same amplitude and phase shift as on rotational position phi1−1°. Thus, when using only the absolute values of the two field components an ambiguity is present due to the fact that the spacing between the sensor track and the inner and outer edges of the poles (or at least the closer one of both edges of the poles) is equal in both rotational positions. Eventually this is due to the specific geometry (i.e. the specific 180° mirror symmetry of the PMR in FIGS. 1A, 1B. While in the embodiment of FIGS. 1A and 1B the radial field component is reversed at phi1+90° and phi1+270°, it is to be noted that in some embodiments the width of the magnetic poles may be such that the projection of the sensor track 114 does not cross the pole center curve in the course of rotation resulting in an amplitude modulation of the radial field component with no phase jump at 90° and 270°. However, the phase jumps assist in determining a global position as described later on. In some embodiments, the unique values limited to an angular range of 180° provided by sensor element 114 based on the radial position of sensor track 112 on magnetic elements 110 is sufficient to determine absolute rotational position, as described in more detail with respect to FIG. 4. In other embodiments, all three field components are sensed by sensor elements 114 to uniquely determine the absolute rotational position over a complete revolution of 360°. In other embodiments, a gradient and an absolute value of at least one field component is utilized to determine the absolute rotational position over a complete revolution of 360°.

In other embodiments, such as those in which the rotating component can move over a complete revolution of 360°, discontinuous or irregular features can be incorporated into PMR 104 to measure absolute rotational position.

FIG. 1C is a chart of field strength (on the ordinate axis) as a function of rotational position ϕ (along the abscissa) for a PMR having 15 pole-pairs (i.e., 30 magnetic elements). FIG. 1C shows radial field strength Br, axial field strength Bz, and tangential/azimuthal field strength Bϕ for an arrangement like the one shown in FIGS. 1A,B. For ease of description, the maximum field strength for each of Br, Bz, and Bϕ has been normalized to 1, but it should be understood that in various embodiments the relative strengths of these components of the overall magnetic field could differ from one another, depending on the size, orientation, and geometry of the magnetic elements (e.g., magnetic elements 110 of FIGS. 1A-1B).

Referring again to FIG. 1C, it can be observed that each of the magnetic field components Bz, Bϕ and Br are periodical signals having a period length and amplitude. While the periodical signals of all field components oscillate at a same frequency, the amplitude of the periodical signal of the Br field component changes in the course of rotation from 0 to 360°. In other words, the Br field component is amplitude modulated at a lower frequency than the periodic signal, while the Bz and Bϕ components are not amplitude modulated. Thus, the amplitudes (signal value from maxima to minima of the periodic signal) of the Bz and Bϕ magnetic field components are relatively constant at 1. In contrast, the amplitude of Br is itself sinusoidal, with maxima of 1 at ϕ=0 and ϕ=180°, and minima of 0 at ϕ=90° and ϕ=270°. In other embodiments the maxima of Br may deviate from 1. For ϕ between 0 and 90° and between 270° and 360°, Br and Bz are in phase, whereas Br and Bϕ are out of phase by a quarter period of the periodic signal. For ϕ between 90° and 270°, Br and Bz are out of phase by half a period of the periodic signal, whereas Br and Bϕ are out of phase by three quarter periods of the periodic signal. This is due to the fact that the signal of the radial magnetic field component Br is reversed at 90° and again reversed at 270° due to the sensor track crossing the magnetic center line of the poles as described above.

In other embodiments, Br, Bz, and Bϕ need not be sinusoidal. For example, with decreased distance between the magnetic target and sensor, each of Br, Bz, and Bϕ could have other shapes, such as triangular waveforms. However, as long as Br, Bz, and Bϕ are dependent on the position of the PMR (or other magnetic structures such as those described below with respect to FIGS. 5-7), the comparison of these values and/or amplitudes can be performed to determine a global position of the sensor element.

The comparison between the amplitudes of Br and Bz, or Br and Bϕ, can be used to determine rotational position. Notably, in the embodiment shown in FIG. 1C, it is not possible to distinguish from the comparison of these amplitudes between ϕ and 180°+ϕ.

According to one embodiment, in addition to the comparison of only Br and Bz or only Br and Bϕ, a comparison of Br and Bz together with a comparison of Br and Bϕ may be used to determine the absolute rotation position from FIG. 1C. When Br is in phase with Bz, the rotation position is determined to be closer to 0 than to 180°. If Br is out of phase with Bz, the rotation position is determined to be closer to 180° than to 0°. Assuming it is determined that the position is closer to 0, in a next step it is determined whether the rotation position is greater than 0 or not. To achieve this Bϕ is used. It is to be noted that for the radial field component the symmetry relation Br(ϕ)=Br(-ϕ) is valid while for the azimuthal field component the symmetry relation Bϕ (ϕ)=-Bϕ (ϕ) is valid. In view of this, Bϕ can be used to distinguish between ϕ>0 or ϕ<0 except for Bϕ=0. In order to distinguish also for Bϕ=0, a gradiometer sensor arrangement may for example be provided in which the gradient of Bϕ in azimuthal direction (ϕ-direction) is measured to determine an absolute rotation position also for Bϕ=0 situations. Such a gradiometer arrangement may be provided for example by two sensor elements sensitive to Bϕ component and placed from each other in azimuthal direction by a distance which is different from the period length of the Bϕ component. Alternatively it is also possible to place a second Bϕ-sensor at a distance to the first Bϕ-sensor, whereby the distance is different from integer multiples of half a spatial period of the Bϕ-waveform, because then it is guaranteed that even if one of the two Bϕ-sensors is at a zero-crossing of the Bϕ-waveform, the second one is at a location with Bϕ>0 or Bϕ<0. Then the sensor can choose the sensor whose signal is stronger to derive the rotation angle.

Figure 1D:
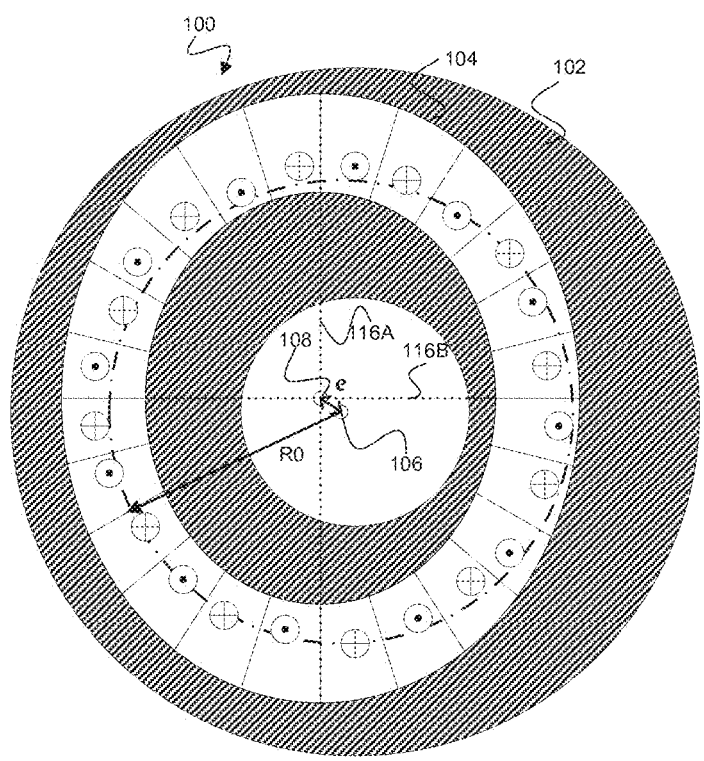
FIG. 1D is a plan view of a magnetic target having an eccentrically mounted magnetic multipole ring of elliptic shape, according to an embodiment.

Alternative or additional, while in FIGS. 1A-1C the amplitude modulation of the radial field component is symmetric with respect to ϕ=180°, it is to be noted that non-symmetric amplitude modulations can be provided in some embodiments. FIG. 1D shows an embodiment wherein PMR 104 has an ellipsoid shape with CPM 108 being the center of the ellipsoid and eccentric to COR 106. Furthermore, the half-axes 116A and 116B of the ellipsoid are provided neither parallel nor perpendicular to a line connecting COR 106 and CPM 108. The non-symmetric amplitude modulation breaks the symmetry relation Br(ϕ)=Br(-ϕ) of the radial field component shown in FIG. 1C and may allow in some embodiments to uniquely determine the absolute positions by evaluating the amplitude of signals Br and Bz or Br and Bϕ. It is to be understood that the schemes described above with respect to FIG. 1C can also be applied to non-symmetric amplitude modulations of the radial component.

Figure 2A:
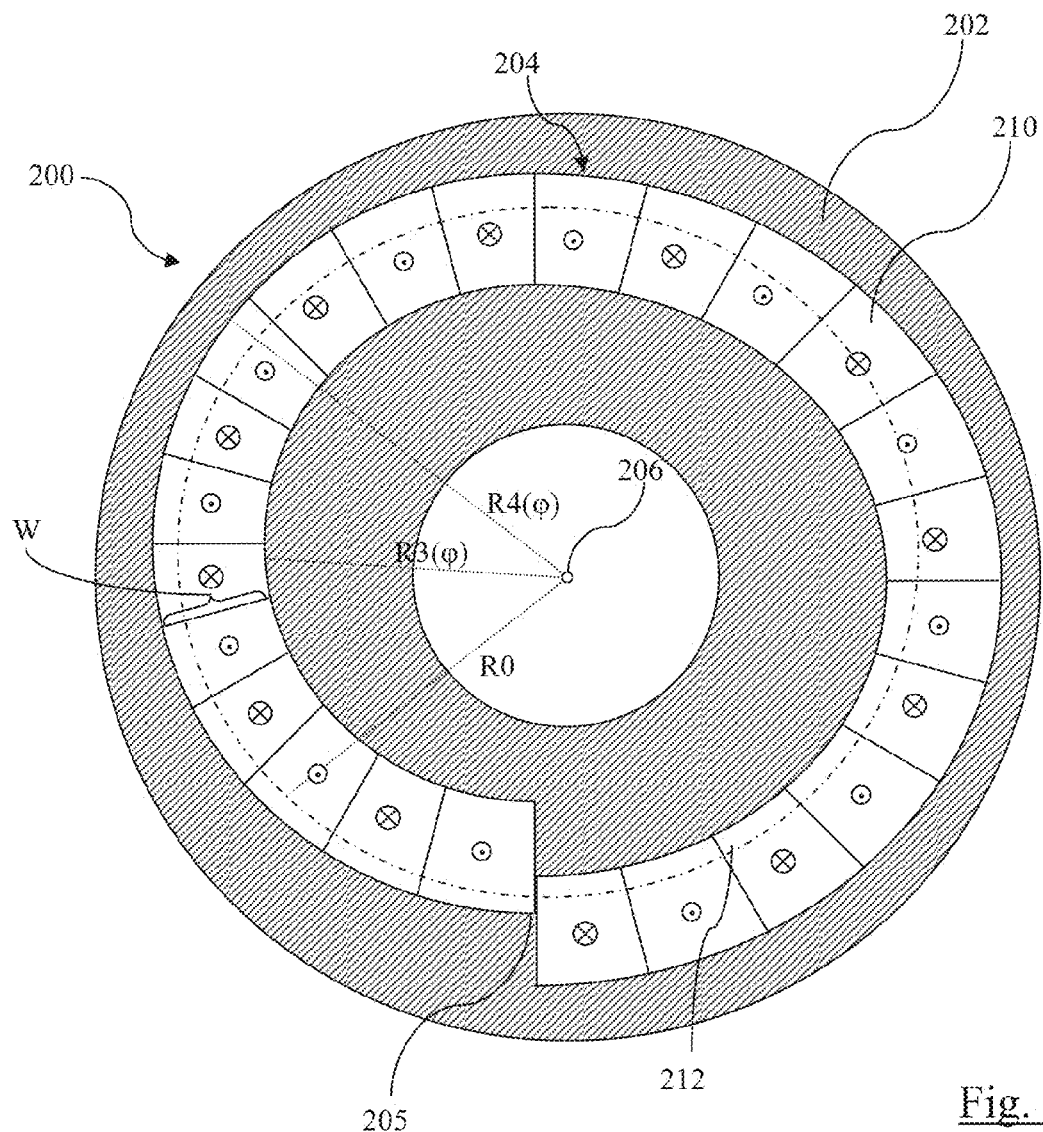
FIG. 2A is a plan view of a magnetic target having a discontinuous magnetic multipole, according to an embodiment.

In alternative embodiments such as that described below with respect to FIG. 2A, asymmetric magnetic rings can be used that result in unique amplitude ratios Br/Bz and Br/Bϕ). As shown in FIG. 2A, magnetic target 200 comprises first portion 202 and magnetic multipole 204. Center of rotation (COR) 206 is the center of rotation of first portion 202. Magnetic multipole 204 comprises a series of magnetic elements 210 arranged in a loop. Sensor track 212 is a track along which sensor elements (e.g., sensor element 114 of FIG. 1B) are configured to measure a magnetic field strength in the radial direction (i.e., parallel to the direction of reading radius R0). Furthermore, one or both of the axial and azimuthal field components can be measured at substantially the same position by arranging further sensor elements on the same sensor die (e.g., sensor die 115 of FIG. 1B). Referring again to the embodiment shown with respect to FIG. 2A, magnetic multipole 204 is shaped as a spiral, with a discontinuity 205 where the two ends of the spiral meet. Because magnetic multipole 204 is not symmetric about any bisection passing through COR 206, the absolute rotational position of magnetic multipole 204 can be ascertained throughout the rotation of first portion 202 by combining the outputs of the various sensor elements of the same sensor die.

In the embodiment shown in FIG. 2A, radii R3 and R4 are a function of the angle ϕ at which magnetic target 200 is rotated, while reading radius R0 is still constant (due to a fixed distance between COR 206 and a sensor element similar to sensor element 114 of FIG. 1B). The radii are related to one another:

$$R3(\phi) < R0 < R4(\phi);$$

and $$R4(\phi) - R3(\phi) = W,$$

where W is a constant.

In practice, it is often desirable to add a design tolerance ε, such that sensor track 212 is positioned radially at least ε away from R3(ϕ) and R4(ϕ). In this way, even despite placement tolerances of the sensor element and/or magnetic elements, the sensor element will be arranged in a region with a meaningful magnetic field throughout the complete range of ϕ. For example, 75% of the radial width W could be configured to be adjacent to the sensor element during the rotation of magnetic target 200, with the remaining 25% used as a guardband for assembly tolerances. The mean radius of the magnetic multipole 204, $(R1(\phi)+R2(\phi))/2$, is linear with respect to ϕ. Furthermore, the radial width W of magnetic multipole 204 is constant with respect to ϕ. In alternative embodiments, the radial width W or the mean radius could be a function of ϕ, and either of them could be irregular or discontinuous. With continuing reference to the embodiment depicted in FIG. 2A, $$(R3(\phi)+R4(\phi))/2=R0+(W\times x/2)(\phi/360°);$$

or $$\mathrm{Sqrt}(R3(\phi)*R4(\phi))=R0+(W\times x/2)(\phi/360°),$$

where x is a constant, such as a value between 0 and 1. In one embodiment, x is about 0.75. As described in more detail with respect to FIG. 4, magnetic target 200 can be used to generate a unique rotational position reading for an attached rotating component, using a single sensor die or chip.

Figure 2B:
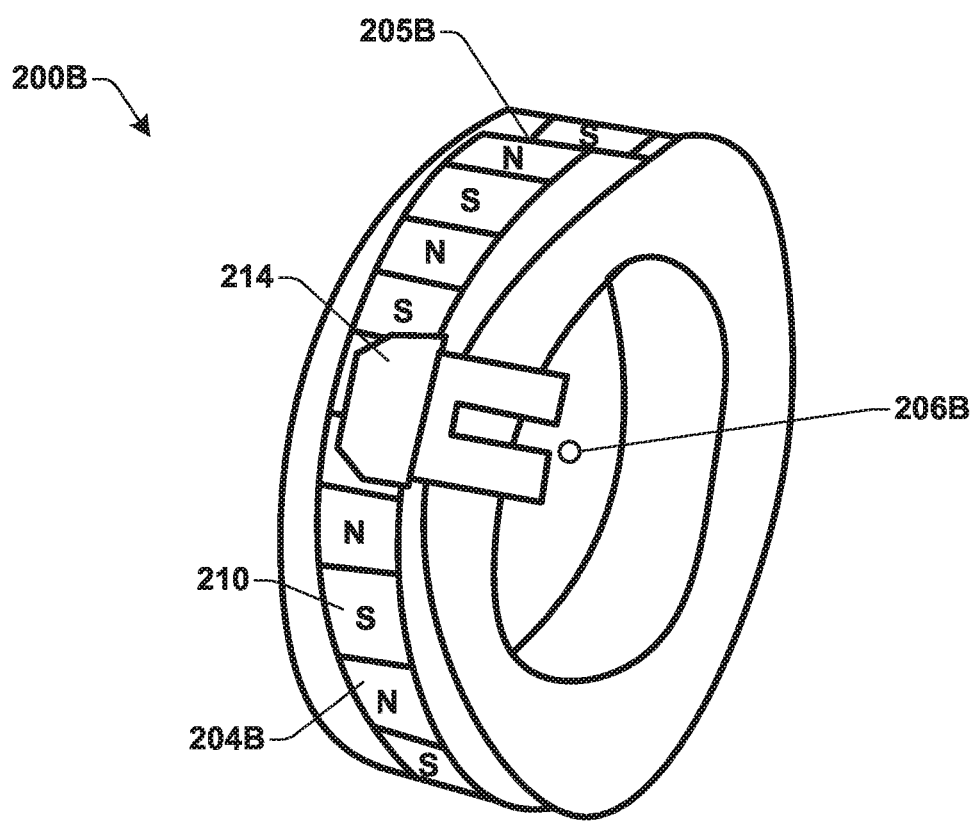
FIG. 2B is a perspective view of a magnetic target and sensor die, according to another embodiment.

FIG. 2B is a perspective view of another embodiment of a magnetic portion 204B and sensor die 214. In the embodiment shown in FIG. 2B, magnetic portion 204B is arranged with its major surface facing radially outward from the COR 206B. Due to the axial offset (axial position of relative to center position) of the strip during rotation, the various field components (radial, axial, and tangential) will vary in magnitude during rotation such that comparison of their amplitudes can be used to ascertain a global position, whereas the instantaneous values can be used to determine a local position. System 200B shown in FIG. 2B has discontinuity 205B. As such, the magnetic field generated by magnetic portion 204B is unique about its entire 360° rotation.

Figure 2C:
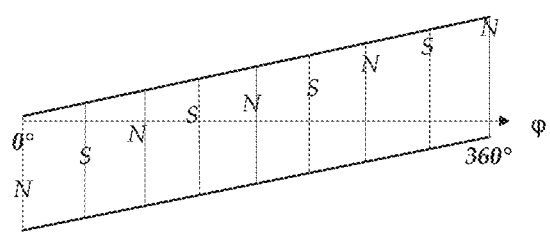
FIG. 2C is a chart of the spatial variation of a permanent magnetic ring according to an embodiment.
Figure 2D:
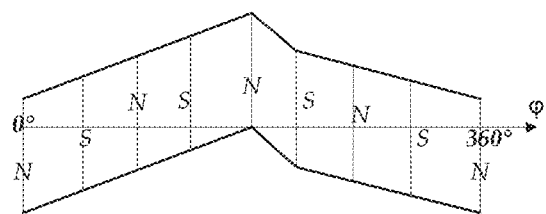
FIG. 2D is a chart of the spatial variation of a permanent magnetic ring according to a further embodiment.

It is to be noted that in the embodiment of FIG. 2A, the air gap direction is parallel to the axial direction and the radial position of the poles varies to provide the amplitude modulation. In FIG. 2B, the air gap direction is in radial direction and the position of the poles varies in axial direction to provide the amplitude modulation. In other words, a spatial variation of the PMR 104 to provide the amplitude modulation is in a direction perpendicular to the air gap direction which allows keeping the air gap constant throughout the rotation. For the radial position variation of FIG. 2A and the axial position variation of FIG. 2B, an offset to a reference position (such as an offset to the minimum position) constantly increases with increasing azimuthal angle ϕ with a discontinuity after one rotation. FIG. 2C shows as an example of a linear increase from ϕ=0° to ϕ=360° for a reduced number of pole pairs. In other embodiments, such as shown in FIG. 2D, the offset may increase in a first region and decrease in a second region. The absolute value of the gradient of the offset may be different in the first and second regions, i.e. the increase in offset between adjacent pole pairs may be faster than the decrease in the second regions or vice versa. It is to be understood that for the embodiments of FIGS. 2C and 2D also gradiometer arrangements may be used to sense the magnetic field components and to determine the rotation position. As previously described with respect to alternative embodiments, magnetic portion 204B can also be configured to rotate with eccentricity about COR 206, such that the radial distance between sensor die 214 and magnetic portion 204B changes. There are other embodiments beyond those described with respect to FIGS. 2A and 2B. In alternative embodiments, for example, the magnetic portion could rotate about COR 206B without eccentricity, and could be a helical strip extending in the axial direction. In such embodiments, the amplitudes of mutually perpendicular field components can be compared to one another to determine a global position (with accuracy depending on the number of pole-pairs of the magnetic portion) and the local position can be determined by observing the magnetic fields in any of the perpendicular directions.

Various alternative targets can be constructed that generate unique magnetic field patterns as a function of ϕ. For example, the poles (e.g., 110, 210) of the magnet ring or strip need not necessarily be identical in size or shape. If they are not identical in size, then the number of poles can be either even or odd. Furthermore, the thickness of the magnetic portions (e.g., 104, 204) could also be varied in the axial or radial directions. One might increase the thickness near the inner diameter of the ring in order to counter-balance the curvature of the ring by putting more emphasis on the inner parts of the ring and pushing the "magnetic" center of the ring outward. Furthermore, the magnetic multipole may have a shape with inner and outer perimeters being circular, and centered on the center of rotation, and yet still generating unique magnetic signal output based on a thickness in axial direction that varies versus azimuthal position. The thickness of the magnetic multipole can be varied such that at some rotational positions the magnetic multipole is thicker near the inner perimeter, whereas for others (e.g., diametrically opposite positions) the magnetic multipole is thicker near the outer perimeter. The thicker parts enhance the field and pull the "magnetic" center towards the thicker portions, causing magnetic field differences as a function of rotational angle ϕ.

Figure 3:
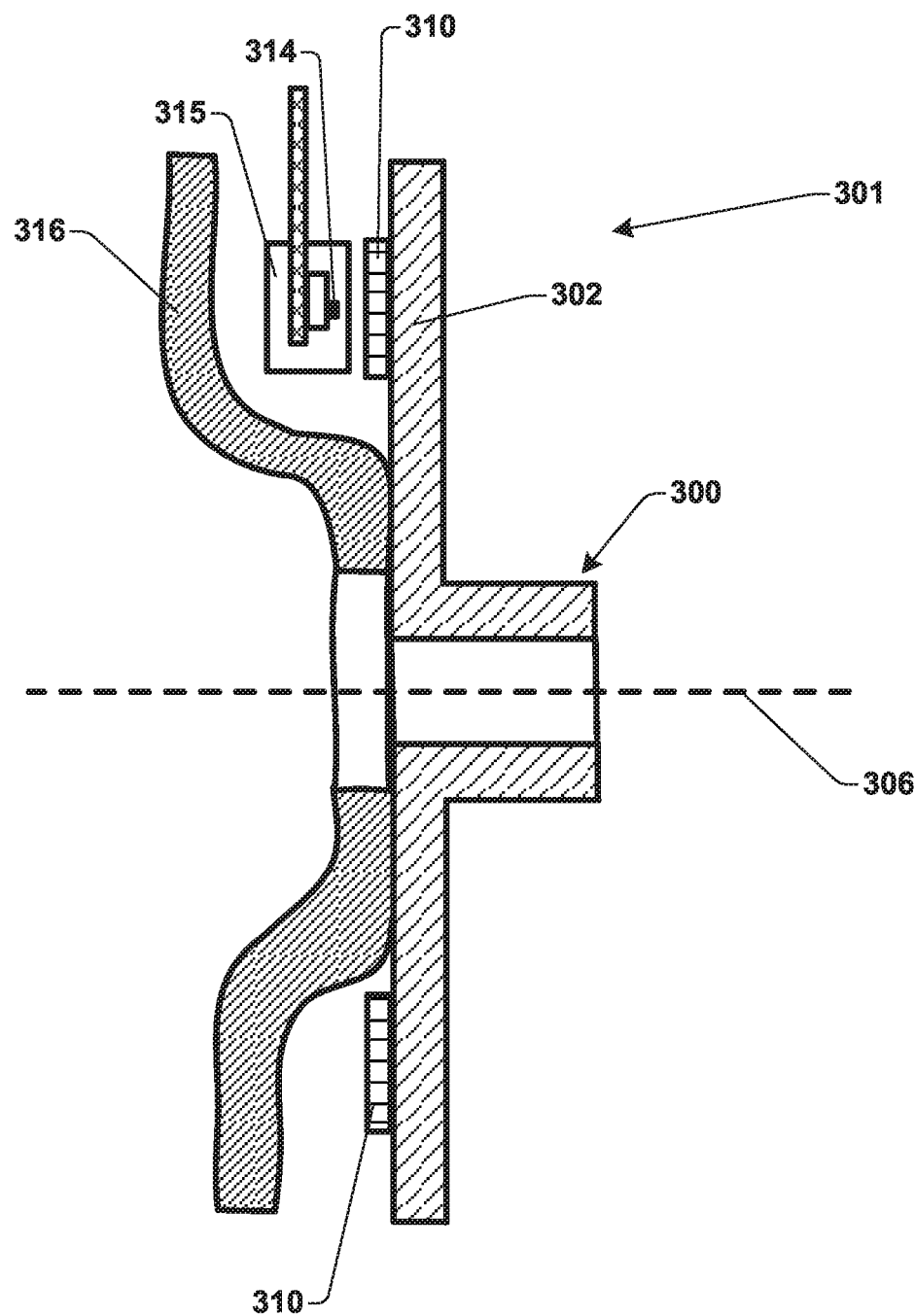
FIG. 3 is a cross-sectional view of a magnetic sensor element and sensor die arranged between a magnetic target and shielding, according to an embodiment.

FIG. 3 illustrates a sensing system 301 that includes shielding against both mechanical damage and electrical interference. The embodiment shown in FIG. 3 includes many of the same components previously described with respect to FIGS. 1A, 1B, and 2, and like parts are shown with similar reference numbers iterated by factors of 100. In addition to the components previously described with respect to FIGS. 1A, 1B, and 2, the embodiment shown in FIG. 3 includes shielding 316. Shielding 316 protects sensor element 314, sensor die 315, and magnetic target 300 from mechanical damage due to nearby components within a system. For example, in the context of the cam shaft previously described, there are often nearby elements that generate heat or particulates that could interfere with the proper functions of sensor element 314 or damage magnetic target 300. Furthermore, in some cases, physical contact between nearby components can cause damage to sensor element 314, sensor die 315, and/or magnetic target 300. Shielding 316 provides a physical barrier to prevent these and other potential unwanted effects. Furthermore, in embodiments where shielding 316 is a material with large relative permeability, shielding 316 can enhance magnetic field strength at sensor 314, due to magnetic mirror charges. The mirror charge effect caused by shielding 316 can further improve magnetic field homogeneity and lead to smaller sensor measurement errors, if the placement of sensor 314 is not accurate. Shielding 316 can be mounted to co-rotate with magnetic target 300, or it can remain in a fixed relationship with sensor 314 (i.e., not rotating). If the shielding 316 is fixed to the rotating magnet its effect on the magnetic field on the sensor elements is more accurate because it avoids change of magnetic field on the shield, which might cause hysteresis or eddy currents, however, it increases the inertia moment of the shaft. So both shields fixed to the sensor or fixed to the rotating magnet have their pros and cons.

Figure 4:
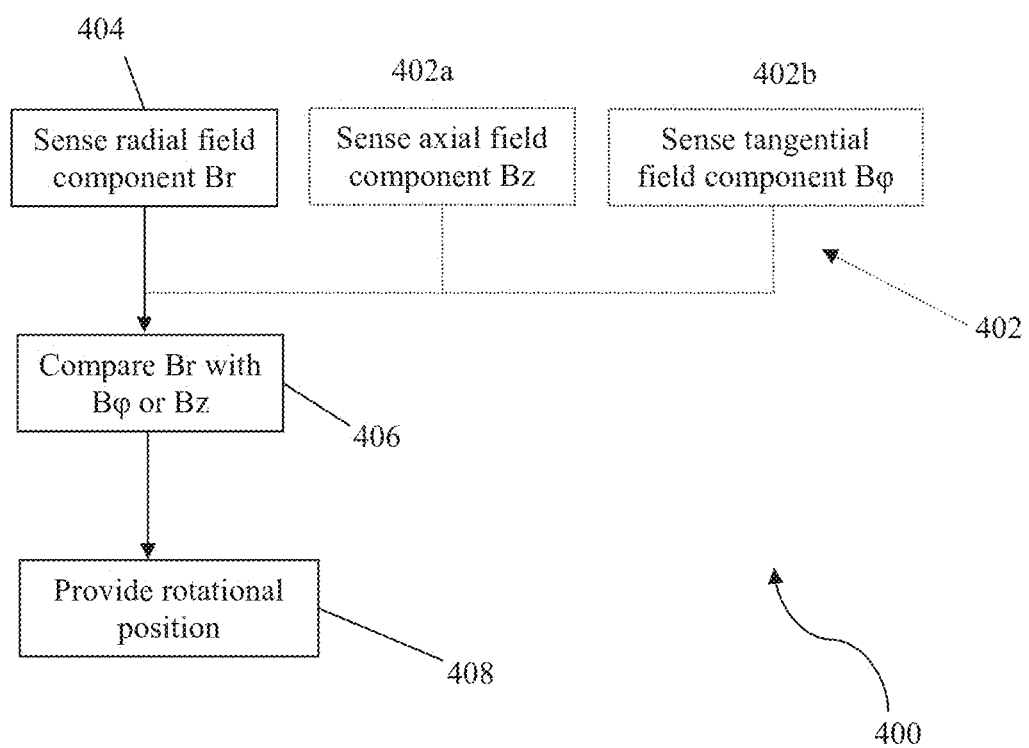
FIG. 4 is a flowchart depicting a method for measuring the absolute rotational position of a magnetic target using a single sensor die, according to an embodiment.

FIG. 4 is a flowchart of a method 400 for measuring the rotational position of a magnetic target, according to an embodiment.

At block 402, the tangential and/or axial magnetic field components (Bφ, Bz) are sensed. In some embodiments, only one tangential magnetic field component Bφ and axial magnetic field component Bz need be sensed. For example, at block 402, one could measure only axial magnetic field component Bz at sub-block 402a, or only measure tangential magnetic field component Bφ at sub-block 402b.

At block 404, radial field component Br is sensed. Radial field component Br is sensed using a sensor element positioned on the same sensor die that was used at block 402. As such, the sensed radial field component Br is measured at substantially the same position as tangential magnetic field component Bφ and/or axial magnetic field component Bz sensed at block 402, or within less than a few millimeters of the same position.

Alternatively, sensing tangential, axial, and radial field components at blocks 402 and 404 can comprise measuring a gradient, which is the difference of the same field component measured at two different spots. A sensor die can contain two or more magnetic field sensor elements each configured to sense the same magnetic field component, such as Br. In this way, the gradient of Br along the direction of these two sensor element positions can be derived. As such, homogeneous magnetic disturbances can be cancelled out, and systematic offset (zero-point) errors of the sensor elements can be cancelled out.

At block 406, radial field component Br is compared to tangential magnetic field component Bφ and/or axial magnetic field component Bz. This comparison can take a number of different forms in various embodiments. For example, in a first embodiment, the comparison comprises generating an output of Br/Bφ. In a second embodiment, the comparison comprises generating an output of Br/Bz. In a third embodiment, the comparison comprises generating an output of $Br/\sqrt{B\phi^2+Bz^2}$. In a fourth embodiment, the comparison comprises generating an output of $Br^2/(B\phi^2+Bz^2)$.

Br and Bz are in phase (i.e. they have a φ-dependence of type cos(N*φ) for N pole-pairs), whereas Bφ is in quadrature with a sin(N*φ) dependence. The three field components can be written as:

$$Br = A(\phi)\cos(N\phi)$$

$$Bz = A\cos(N\phi)$$

$$B\phi = A\sin(N\phi)$$

with N being the number of pole pairs and φ being the azimuthal angle in radian units. All signals Br, Bz and Bφ have in common that they consist of two factors, an oscillation factor (either sin(Nφ) or cos(Nφ)) and an amplitude factor. The oscillation factor is oscillatory with φ increasing from 0 to 2π. The number of oscillation between 0 and 2π depends on the number of pole pairs N.

Notably, Br has an amplitude A(φ) that is a function of φ, whereas Bz has an amplitude A that is constant (or, in some embodiments, a function of φ with a much weaker dependence on φ). As long as cos(N*phi) is different from 0 the system can compute Br/Bz=A(φ)/A, which is a smooth function of φ according to the embodiments shown in FIGS. 1A-1B and 2. From this ratio, the approximate rotational position of magnetic target can be determined. While the preceding quotient provides information regarding whether the sensor is closer the $1^{st}$, $2^{nd}$, or $N^{th}$ pole-pair, it does not necessarily provide information regarding what magnetic element in particular the sensor is closest to. Thus, the function can be used to determine the global angular position (with a resolution of 360°/N) yet not the local angular position (with a resolution better than 360°/N). For the local angular position, various additional sensors (such as Bφ and Bz sensors) can be arranged on the same chip or die as the radial field strength sensor element, to measure the absolute strength (rather than the amplitude) of the magnetic field in those directions.

Therefore, in the first embodiment the quotient contains a cot(N*φ) term which must be cancelled by some algorithm in order to determine the ratio of amplitude(Br)/amplitude(Bφ), which is related to the global rotational position of the magnetic target, whereas the second, embodiment from block 406 have only cos(N*φ) terms in numerator and denominator that cancel out so that the ratio of signals is identical to the ratio of their amplitudes (unless the numerator vanishes). Having the ratio of amplitudes (i.e., either amplitude(Br)/amplitude(Bz) or amplitude(Br)/amplitude(Bφ)), the radial offset of the magnetic field sensor from the center of the magnetic track can be estimated and since this radial offset is a smooth function of the global angular position the sensor can infer if the angular position is roughly near e.g. 0° or 90° or 180°. In still further embodiments, at block 406 Bφ and Bz can be compared to one another in order to derive N*φ, which gives the local angular position. This local angular position has an N-fold ambiguity—therefore it cannot decide about the global angular position, yet it has a good angular resolution within one pole-pair, i.e. within an angular range of 360°/N. The sensor system can combine this local angular position obtained by Bφ and Bz with the global angular position obtained by Br and Bφ or Br and Bz.

In the case of magnetic gradient sensor embodiments, a chip has a main surface parallel to the (R,φ)-plane. Two Bz sensor elements are arranged at identical (R,z)-coordinates, but different φ-coordinates along the surface of the chip. The system can measure Bz(R, φ1, z) and Bz(R, φ2, z) and compute the difference between those two measurements. Not only are background fields cancelled by the subtraction, but also even in those rotational positions where Bz is zero (such as at the 2*N zero-crossings along one revolution) the system provides usable data, unlike the Br/Bz embodiment described above. Even if the magnetic multipole is positioned such that the field on one sensor element vanishes (e.g., Bz(R, φ1, z)=0), the field on the other sensor element is different from zero as long as the spacing of both sensor elements is less than the azimuthal length of a magnetic pole (=φ*R0/N). If the Bz-field varies with cos(N*φ), the gradient of the Bz-field along φ-direction varies with sin(N*φ).

At block 408, the rotational position of the magnetic target is determined. This can be accomplished in two ways, either simultaneously or independently. First, the system can detect Bφ and/or Bz, which are highly oscillatory. Bφ and Bz vary approximately sinusoidally with N periods, in those embodiments where the magnetic multipole includes N pole-pairs. This can be used as a speed sensor to give incremental pulses upon rotation of the magnetic target. Second, the Br-component can be used to measure the rotational position, for example if the wheel rotation is slow or at halt or shortly after power-on of the system.

From the above it can be observed that an amplitude of an oscillatory magnetic field component signal with varying amplitude is determined and set in relationship to an amplitude of an oscillatory signal related to another magnetic field component. Distinguished from other concepts for determining a position, rather than setting the field components in relation to each other (e.g. Bϕ/Br), embodiments described herein first determine an amplitude from each of at least two field components and then sets the amplitudes in relationship to each other, e.g. by division. The amplitude is determined by cancelling the oscillatory factor. In a gradiometer system this can be achieved by measuring the respective field component at two different locations along the direction of the PRM 104. According to some embodiments, the sensor tracks of the two sensors forming a gradiometer are the same, with only the position being shifted along the sensor track. In other embodiments two sensors may be arranged along the direction of the PRM 104 such that the sensor tracks are offset to each other but the projection along the air gap direction of both sensor tracks is still encompassed by the PRM 104. It is to be noted that the above described gradiometers allow determining the amplitudes without actually going through an extrema. In other non-gradiometer embodiments, the sensor system may measure only one field component at only one location. In such systems, the amplitude may typically be determined after passing an extrema (minimum or maximum) and then determine the amplitude from the extrema.

Figure 5A:
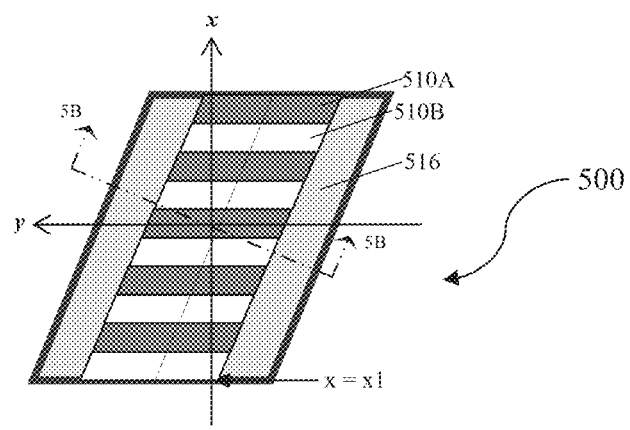
FIGS. 5A and 5B illustrate a linear position sensor and shielding, according to an embodiment.

FIG. 5A is a plan view of linear position magnetic target 500, which includes shielding 516 (in this embodiment, further acting as a substrate) and a series of magnetic elements, including North Pole magnetic elements 510A and South Pole magnetic elements 510B. In this embodiment, the sensor track is shown as an x axis, and the centers of the magnetic elements 510A and 510B are shown as a dashed line. It should be understood that the reference frame shown here is used for convenience only and should not be construed as limiting. For example, in various alternative embodiments, the sensor track could be any direction having an x-component, other than the dashed line shown passing directly along the centers of the magnetic elements 510A and 510B. In any direction having an x-component other than along the dashed line, the field strength along the y direction changes sinusoidally as a function of position. The amplitude of this sinusoidal pattern and its sign (related to the magnetic field components in x or z direction) provide unique values that can be used to determine absolute position.

Figure 5B:
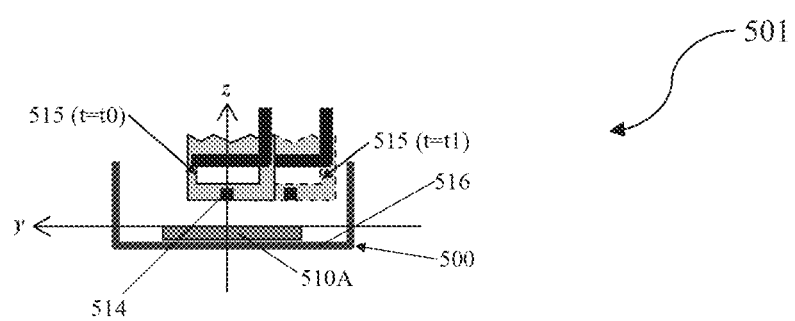

FIG. 5B is a cross-sectional view of the linear position sensor system 501, including magnetic target 500 of FIG. 5A, taken across line 5B-5B of FIG. 5A. FIG. 5B illustrates a sensor die 515, which includes at least one sensor element 514, at two positions: x0 and x1. As previously described, the relationship between two perpendicular magnetic field components can be sensed by various sensor elements on sensor die 515, wherein one of the magnetic field components is sinusoidal and varies with a function of the position of the magnetic target 500 and one of the magnetic field components does not.

As shown in FIG. 5B, shielding 516 goes higher than the top surface of the magnet (z=0), such as even higher than the sensor element(s) within sensor die 515. In this way, shielding 516 shields against external By-fields, yet the distance between sensor die 515 and shielding 516 is large enough not to overly affect the Bx, y, z-field components of the magnetic elements 510A, 510B.

Figure 6:
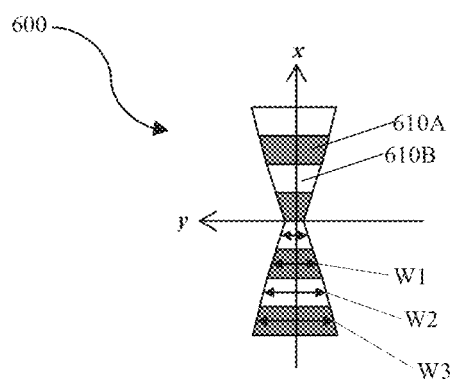
FIG. 6 is a plan view of a linear position sensor target, according to another embodiment.

FIG. 6 illustrates yet another magnetic target 600, according to an embodiment. In magnetic target 600, the width of the poles 610A, 610B varies with the absolute position. Thus, an adjacent sensor element can determine based on the field strength whether it is nearest a pole (e.g., 610A, 610B) having width W1, W2, W3, or some other width. This can be accomplished by arranging a gradiometer that detects dBy/dy, which depends on the widths of the poles and thus on the global position. In some embodiments, the sensor position may be constant in the center of the poles (with respect to the y-direction).

Figure 7:
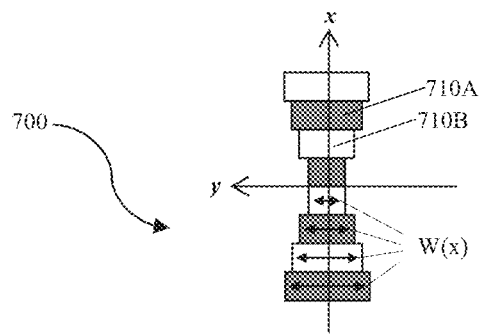
FIG. 7 is a plan view of a linear position sensor target, according to yet another embodiment.

FIG. 7 illustrates yet another magnetic target 700. In magnetic target 700, similar to the embodiment described with respect to FIG. 6, the width of the poles changes as a function of position. However, in contrast with the embodiment shown with respect to FIG. 6, the edges of the poles 710A, 710B create a jagged shape rather than a smooth one.

In both of the magnetic targets 600 and 700 of the preceding two figures, a so-called absolute magnetic field sensor element can detect the magnetic field in the y direction, By, along the axis y=0. Background magnetic fields, however, could be included in this measurement (e.g., if the sensor elements are not sufficiently shielded). Alternatively, a gradient sensor can be used to detect the change in By as a function of y, for example by placing one element at y=−1 mm and the other one at y=+1 mm, and calculating the difference between the By-fields measured by each sensor element. This gradient is larger for small y-width of the poles. In those embodiments, because dBy/dy is differential, it is not affected by homogeneous magnetic disturbances.

The smallest y-width of all poles 610A, 610B and 710A, 710B has to be large enough not to be degraded by mounting tolerances. If the y-play of the arrangement (e.g. the bearing of a movable part) is +/−1.5 mm the minimum width can be 4 mm or greater, for example. At large widths, By changes as a function of y only marginally, so that the system cannot discriminate between poles of different widths any more. Moreover, at air gap changes the By-field also changes. The system can be improved to compute By-amplitude over Bx-amplitude or By-amplitude over Bz-amplitude, yet they also change slightly. Further changes of By-field or By-amplitude, or changes to the ratio of By-amplitude over Bx- or Bz-amplitude, can result from inaccurate y-positioning. Nominally the sensor die should be located at y=0, yet due to assembly tolerances it can also rest e.g. at y=0.5 mm or 1 mm (or −0.5 mm or −1 mm). This also slightly changes the By-field. All these reasons limit the available number of useful discretization steps for widths (e.g., W3-W2, W2-W1 of FIG. 6).

A sensor with a stripe of 1 mm thickness on a steel-back with 4 mm long north- and south-poles in the x-direction and an air gap of 1-3 mm between sensor element and surface of magnet, and a y-position of the sensors between −1.5 mm-1.5 mm, can discriminate between 6 different widths:

Ratio=0.25-0.515 for $w$=4 mm

Ratio=0.13-0.255 for $w$=7 mm

Ratio=0.039-0.126 for $w$=9 mm

Ratio=0.0067-0.0385 for $w$=12.5 mm

Ratio=0.00075-0.0063 for $w$=17 mm

Ratio=0.00007-0.00075 for $w$=22 mm whereby "Ratio" is the ratio of (difference of By-amplitudes for sensor elements whose y-position differs by 2 mm) divided by (average Bx-amplitude on both sensor elements).

The embodiments described herein address many of the deficiencies of conventional systems. In particular, a single sensor die or chip or at least a single sensor package which might contain more than one chip is used in each of the embodiments above. This results in lower costs and higher reliability of the overall system. Furthermore, the single die/single package reduces costs and failure modes associated with electromagnetic compatibility and electrostatic discharge. The single die/single package constructions further reduce the costs and failure modes by reducing the number of connections, wires, harnesses, discrete capacitors, and other structures. Furthermore, the single chip/single package design reduces the power dissipation of the system. Embodiments can use only a single multipole, rather than two different magnets often found in conventional systems (one multi-polar and the other one dipolar). The multi-polar permanent magnet described in embodiments is simple to manufacture, because it can be a plain, relatively flat structure. For example, in target wheels (i.e., circular magnetic targets that rotate about a center of rotation), the permanent magnet need not be twisted out of the (r,φ)-plane. In alternative embodiments, the permanent magnetic pattern can also be applied to the outside of a drum (i.e., by attaching it to a curved (φ,z)-surface instead of the flat (r,φ)-surface). This is readily seen if the magnetic stripes of FIGS. 6, 7 are applied to the drum surface such that they encircle the drum fully whereby the bottom edge and the top edge (i.e. the edges with minimum and maximum x-position) coincide.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A position sensor comprising:
    a magnetic target comprising a magnetic multipole configured to generate a magnetic field comprising, at a first region, a first component, a second component, and a third component, wherein the first, second, and third components are mutually perpendicular to one another at the first region and wherein the magnetic target is configured and arranged to co-rotate with a rotating component such that the first component oscillates in a course of a rotation with a non-constant amplitude at the first region; and
    a sensor die comprising:
    a first sensor element configured to measure the first component at the first region; and
    a second sensor element configured to measure at least one of the second and third components substantially at the first region; and
    wherein the first and second sensor elements are mounted such that an air gap distance to a permanent magnetic ring (PMR) of the magnetic multipole is substantially constant in the course of the rotation and a projection in an air gap direction of a sensor track of the first sensor element, and a projection in another air gap direction of a sensor track of the second sensor element are both fully encompassed by the magnetic multipole.

2. The position sensor of claim 1, wherein the magnetic multipole comprises a set of pole pairs, wherein the first and second sensor elements are configured to provide signal amplitudes to determine a global position of the magnetic target.

3. The position sensor of claim 1, wherein the magnetic multipole comprises a ring mounted eccentrically on a first portion having a center of the rotation.

4. The position sensor of claim 1, wherein the magnetic multipole comprises a non-toroidal geometry.

5. The position sensor of claim 1, wherein the magnetic multipole comprises a discontinuity.

6. The position sensor of claim 1, wherein at least one of the first sensor element and the second sensor element comprise a gradiometric sensor system.

7. The position sensor of claim 1, and further comprising a circuitry configured to:
    determine a first amplitude corresponding to an output from the first sensor element;
    determine a second amplitude corresponding to an output from the second sensor element; and
    produce a signal corresponding to the first amplitude divided by the second amplitude.

8. The position sensor of claim 7, and further comprising a third sensor element configured to measure at least one of the first, second and third components.

9. The position sensor of claim 8, wherein:
    the circuitry is configured to determine a global position based upon the signal; and
    the circuitry is further configured to determine a local position based upon an output of the third sensor element.

10. The position sensor of claim 1, and further comprising a shielding, wherein the sensor die is arranged between the shielding and the magnetic multipole.

11. A magnetic multipole comprising:
an alternating sequence of magnetic south and north poles arranged along a first direction arranged such that a magnetic field generated by a magnetic multipole at a first region has a first component, a second component, and a third component, wherein the first, second, and third components are mutually perpendicular at the first region, wherein
an element to mount the magnetic multipole on an axis for a rotation around a center of the rotation; and
the magnetic multipole is mounted on the element such that the first component oscillates with an amplitude that is not uniform along a sensor track circle and the second component oscillates with another amplitude that is uniform along the sensor track circle, wherein the sensor track circle is a circle centered to the axis of the rotation.

12. The magnetic multipole of claim 11, and further comprising a substrate, wherein the alternating sequence is arranged on the substrate.

13. The magnetic multipole of claim 11, wherein the magnetic multipole comprises a thick portion and a thin portion.

14. The magnetic multipole of claim 11, wherein the magnetic multipole comprises a non-toroidal geometry.

15. The magnetic multipole of claim 14, wherein the magnetic multipole comprises a discontinuity.

16. A method of determining a position of a member that is movable in a first direction, the method comprising:
arranging a magnetic multipole along the first direction, the magnetic multipole comprising a plurality of magnetic poles having alternating polarity;
arranging at least two magnetic sensor elements at a first region proximate to the magnetic multipole and spaced apart from the magnetic multipole in a second direction, wherein the second direction is perpendicular to the first direction;
sensing a first magnetic field component of a magnetic field of the magnetic multipole along a third direction, wherein the third direction is perpendicular to both the first and second directions at the first region to generate a first signal;
sensing a second magnetic field component of the magnetic field of the magnetic multipole along a fourth direction that is perpendicular to the third direction at the first region to provide a second signal; and
deriving, from the first signal, a first information that is indicative of an amplitude of a signal course of the first magnetic field component;
deriving, from the second signal, a second information that is indicative of another amplitude of a signal course of the second magnetic field component; and
combining the first and second information in order to provide a global position of the member.

17. The method of claim 16, and further comprising sensing a gradient of the magnetic field component along the third direction and deriving the first information based on the sensed gradient.

18. The method of claim 16, wherein:
a first magnetic field strength of the magnetic multipole is a sinusoidal function of the position and has a first amplitude that is a strong function of the position; and
a second magnetic field strength of the magnetic multipole is a sinusoidal function of the position, and has a second amplitude that is either not a function or only a weaker function of the position in relation to the first amplitude.

19. The method of claim 16, and further comprising sensing a third magnetic field strength of the magnetic multipole corresponding to a third magnetic field perpendicular to the first direction at the first region, and determining a local position based upon the third magnetic field strength.

* * * * *